April 18, 1967  F. SAMET  3,314,439
PNEUMATIC COMPUTER
Filed Dec. 1, 1964  2 Sheets-Sheet 1

FRANK SAMET
INVENTOR.

BY
Thomas W. Kennedy
ATTORNEY

April 18, 1967 F. SAMET 3,314,439
PNEUMATIC COMPUTER
Filed Dec. 1, 1964 2 Sheets-Sheet 2
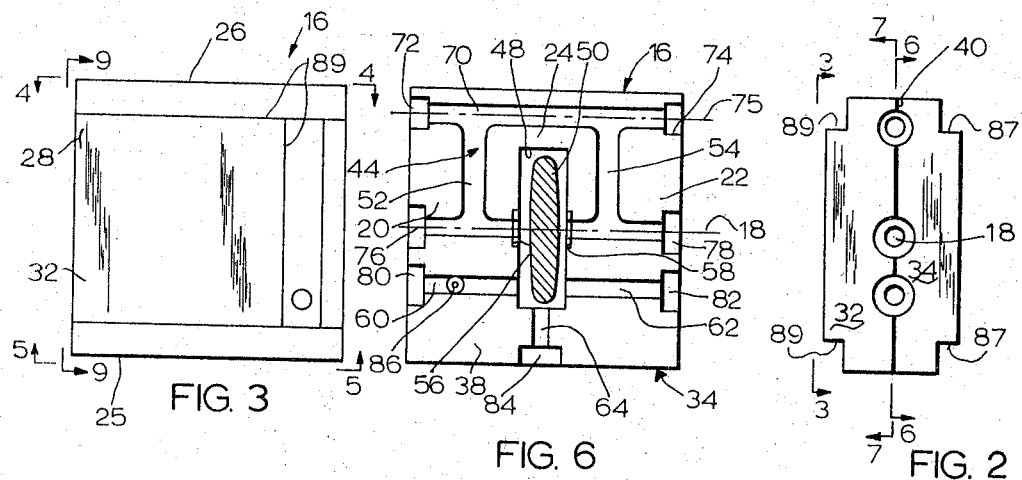
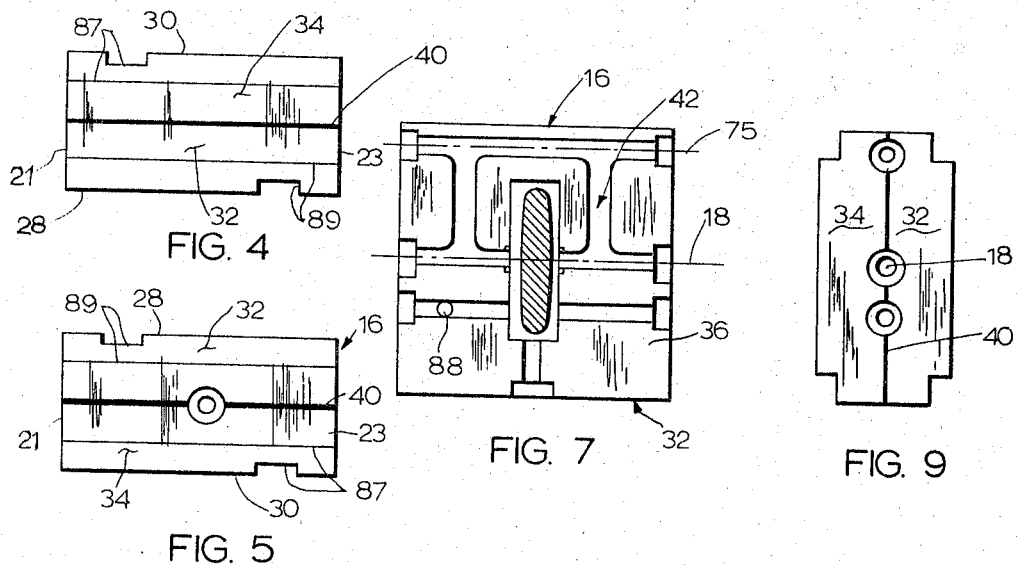
FRANK SAMET
INVENTOR.
BY
Thomas W. Kennedy
ATTORNEY

United States Patent Office 3,314,439
Patented Apr. 18, 1967

3,314,439
PNEUMATIC COMPUTER
Frank Samet, New York, N.Y., assignor to General Precision Inc., Little Falls, N.J., a corporation of Delaware
Filed Dec. 1, 1964, Ser. No. 414,970
9 Claims. (Cl. 137—109)

The present invention relates to pneumatic digital computers, and particularly to means for fabricating accurately and economically pneumatic digital computer elements, modules and circuits.

It is well known that all digital computation functions can be performed by appropriate combinations of bistable elements or "flip-flops." The basic digital operations are counting, switching and memory. Bistable devices can be combined into components which perform specific arithmetic, logic, or memory functions.

A prior-art pneumatic circuit element, as described in U. S. patent application No. 240,613 filed November 28, 1962, by Hugh E. Riordan, now Patent No. 3,151,623, assigned to the same assignee as this application, comprises a cylinder with a ball or other form of piston adapted to operate between two stable end positions and is pneumatically controlled by five external connections. One or more of the five external connections may be closed for certain types of logic operations.

A prior-art module having a plurality of such circuit elements, as described in U.S. patent application No. 202,413, now abandoned, assigned to the same assignee as in this invention, by Frank Samet, the same inventor as in this invention, is a multi-layer sandwich of thin plates, with said plates arranged in parallel planes that are substantially at right angles to the axis of the cylinder of the element. This sandwich type of module requires a minimum of five parallel plates with four joints disposed normal to the axes of the elements. One problem with such prior-art module is the sealing of the joints.

In accordance with one embodiment of the present invention, joint leakage is minimized by using a different type of construction of such a module with bistable elements, which has only two plates with a single joint therebetween.

Accordingly, it is one object of the invention to minimize leakage from the elements of a pneumatic digital computer.

It is another object of the invention to provide an improved pneumatic digital computer module comprised of blocks of standard size and shape having substantially-identical basic pneumatic-digital-computer circuit elements.

To the fulfillment of these and other objects, the invention provides a module containing a pneumatic digital computer circuit and comprising a plurality of blocks fitted together with some of said blocks having an identical size and shape and containing an identical, basic pneumatic-digital-computer circuit element. Each block has two interconnected plates with opposite inner faces, substantially coplaner and in contact along a sealed joint, and at least one of said faces has a pattern of grooves for forming at least a portion of said circuit.

Other objects of the invention will become apparent upon reading the annexed detail description in connection with the drawings wherein like parts are designated by like numerals throughout the several views, and wherein:

FIG. 2 is a sectional view taken along line 2—2 of FIG. 1;

FIG. 3 is a sectional view taken along line 3—3 of FIG.2;

FIG. 4 is a sectional view taken along line 4—4 of FIG. 3;

FIG. 5 is a sectional view taken along line 5—5 of FIG. 3;

FIG. 6 is a sectional view as taken along line 6—6 of FIG. 2;

FIG. 7 is a sectional view taken along line 7—7 of FIG. 2;

FIG. 9 is a sectional view taken along line 9—9 of FIG. 3;

Figure 1:
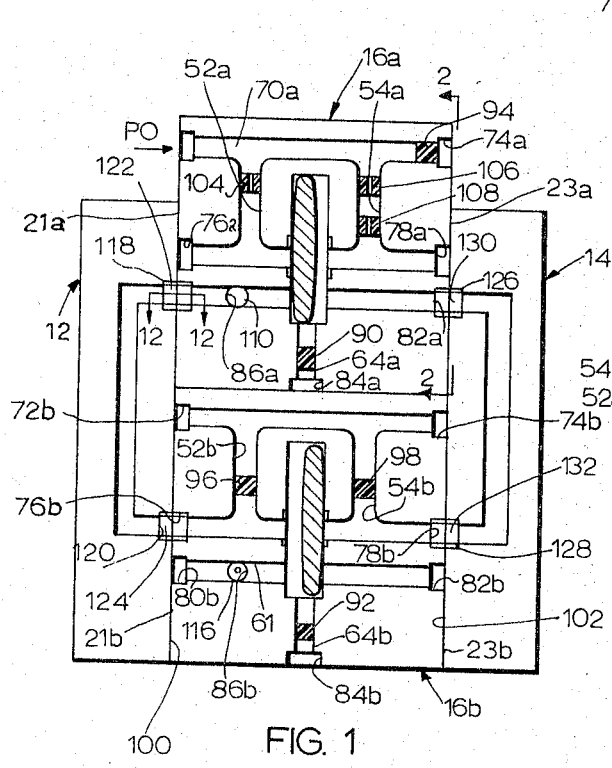
FIG. 1 is a sectional view of a pneumatic-digital-computer module embodying features of the present invention.

Referring to FIG. 1, one embodiment of the present invention is a pneumatic-digital-computer module 10 comprising a pair of identical or basic blocks 16a, 16b, stacked one above the other in courses, and a pair of special or return-bend blocks 12, 14, which structurally interconnect said pair of blocks 16a, 16b. Module 10 contains a multi-element circuit, which is a free running multi-vibrator, as described fully in the aforementioned U.S. application No. 240,613.

Standard block 16, as shown in FIGS 2-7, incl., is preferably of rectangular cross-section and profile in both longitudinal and transverse dimensions. Block 16 has an axis 18, a pair of axially-spaced end walls 20, 22 with respective axially-outer end faces 21, 23, and a peripheral wall 24 with four radially-outer exterior side faces 25, 26, 28, 30, which are substantially parallel to axis 18.

Block 16 is made of a pair of interconnected plates 32, 34, having respective, oppositely-facing, inner faces 36, 38, that are substantially coplaner along a sealed joint 40.

Face 36 has a pattern of grooves 42; and face 38 also has a separate pattern of grooves 44, which are preferably a mirror image of pattern 42. When plates 32, 34 are assembled, with their faces 36, 38 in contact along said joint 40, their groove patterns 42, 44 form a basic pneumatic-digital-computer circuit element 46.

Walls 20, 22, 24 enclose a cylindrical cavity 48 containing a shuttle-ball 50 having alternate positions A, B, C within said cavity 48. End wall 20 has a first axial passage 52 connecting to one end of cavity 48 adjacent position A and end wall 22 has a second axial passage 54 connecting to the other end of cavity 48 adjacent position B. End wall 20 has a first valve-seat port 56 opening into cavity 48 from passage 52, and end wall 22 has a coaxial valve-seat port 58 opening into cavity 48 from passage 54. End wall 20 also has a first end passage 60 and end wall 22 has a second end passage 62 respectively adjacent passages 52, 54 and opening into respective ends of cavity 48 adjacent ports 56, 58. Wall 24 has a central passage 64 opening into cavity 48 adjacent position C intermediate of the ends of cavity 40.

Walls 20, 22, 24 (FIGS. 6, 7, 8) have a common header passage 70 extending therethrough and connecting to said axial passage connections 52, 54, with a coupling port 72 through end face 21 disposed at one end of the header 70 in end wall 20, and a coupling port 74 through end face 23 disposed at the other end of header 70 in end wall 22. Port 74 is coaxial with port 72 along a header axis 74, which is parallel to axis 18.

Passage 52 has a coupling port 76 in face 21, passage 54 has a coupling port 78 in face 23, passage 60 has a coupling port 80 in face 21, passage 62 has a coupling port 82 in face 23, and passage 64 has a coupling port 84 in face 25. Passage 60 also has a vent port 86 in face 30, and passage 62 also has a vent port 88 in face 28.

Figure 8:
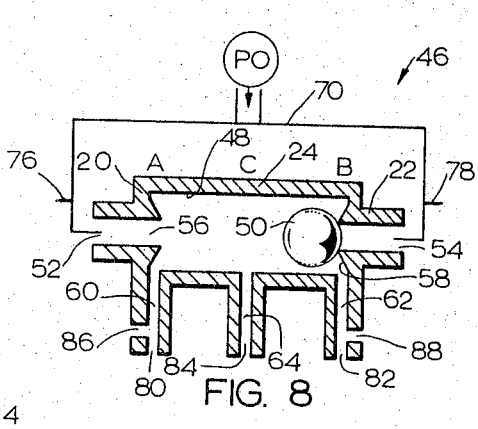
FIG. 8 is a schematic sectional view corresponding to FIG. 6.
Figure 10:
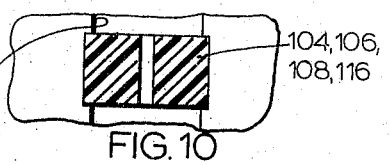
FIG. 10 is an enlarged detail of a portion of FIG. 1.
Figure 11:
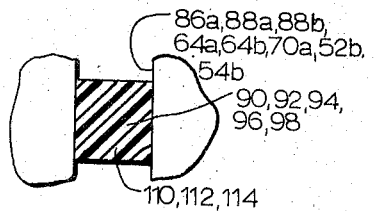
FIG. 11 is an enlarged detail of another portion of FIG. 1.

With the construction of block 16, its basic element 46 is a tristable type of element with passage 64 open as shown in FIGS. 6, 7, 8. Block 16 can also be used as a bistable element instead of a tristable element, by inserting a stop plug (FIG. 11) in passage 64 adjacent port 84.

In FIG. 1, passages 64a, 64b, 70a, 52b, 54b have respective stop plugs 90, 92, 94, 96, 98 (FIG. 11) for closing respective parts 84a, 84b, 74a, 72b, 74b and to minimize leakage across said stop plugs.

End faces 21a, 21b, are in sealing engagement with the adjacent face 100 of block 12 for closing ports 76a, 72b, 80b. End faces 23a, 23b are in sealing engagement with the adjacent face 102 of block 14 for closing ports 78a, 74b, 82b.

In FIG. 1, passage 52a has an orifice plug 104, and passage 54a has axially-spaced orifice plugs 106, 108. Vent ports 86a, 88a (not shown), 88b (not shown), have respective stop plugs 110, 112, 114 for sealing said ports. Vent port 86b also has an orifice plug 116.

Figure 12:
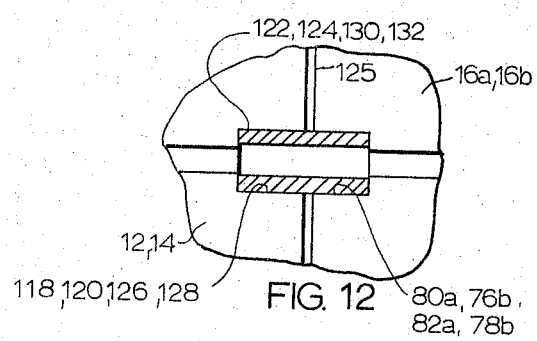
FIG. 12 is a sectional view taken along line 12—12 of FIG. 1.

As shown in FIGS. 1 and 12, block 12 has coupling parts 118, 120 with respective coupling sleeves 122, 124 connected to ports 80a, 76b and block 14 has coupling ports 126, 128 with respective coupling sleeves 130, 132 connected to ports 82a, 78b.

While the present invention has been described in a preferred embodiment, it will be obvious to those skilled in the art that various modifications can be made therein within the scope of the invention. For example, block 16 can be used individually to make the various logic elements described in the aforementioned U.S. patent application No. 240,613, including a "not," "and," "or," "nor," and "gate" type of logic elements. The "not" logic element described therein can be furnished in block 16 by providing the following: fluid pressure to header 70, an input pulse to passage 62 through port 82, inserting a stop plug 65 in port 88, inserting a stop plug 65 in passage 64, venting passage 60 through port 86, inserting a stop plug in port 80, and receiving the output pulse at port 78. As an additional example, the "and" logic element described in said application can be furnished in block 16 by providing the following: fluid pressure in header 70, a first input pulse to passage 60 through port 80, a second input pulse to passage 64 through port 84, inserting a stop plug 65 in port 86, inserting a stop plug 65 in passage 62 adjacent port 82, leaving port 88 permanently open adjacent passage 62, and receiving the output pulse at port 82 adjacent passage 64. It is intended that the appended claims cover all such modification.

What is claimed is:

1. A module containing a pneumatic digital computer circuit and comprising a plurality of blocks fitted together with some of said blocks having an identical size and shape and containing an identical basic pneumatic-digital-computer circuit element;

each module block having two interconnected plates with opposite inner faces, the faces being in sealing contact along a sealed joint, and at least one of said faces having a pattern of grooves forming at least a portion of said circuit;

each module block having a peripheral wall with an axis and a pair of axially-spaced end walls forming a cavity adapted to contain a shuttle displaceable along said axis relative to said cavity walls for substantially, but not completely, sealing said cavity and for assuming a plurality of stable positions maintained solely by the effect of pressure and flow forces acting on the shuttle;

said peripheral wall and said end walls having a common supply header passage extending therethrough with coupling ports disposed in the axially-outer sides of said end walls;

said end walls having respective first and second axial passages with respective passage ends connected to said header and having respective valve-seat ports at their opposite ends opening into said cavity and coaxial with each other and with said cavity and cooperating with said shuttle for sealing-off said axial passages when the shuttle is at a stable position over their respective valve seats;

said end walls having respective third and fourth passages with respective ports opening into said cavity adjacent said valve seats and having respective coupling ports at their opposite ends disposed in the axially-outer sides of said end walls; and said peripheral wall having a central passage with a port opening into said cavity intermediate said end walls and with a coupling port at its opposite end disposed in the radially-outer side of said peripheral wall for forming said basic pneumatic-digital-computer circuit element.

2. A module as claimed in claim 1, in which the two plates of each standard block are identical to each other with the groove pattern in one plate being a mirror image of the groove pattern in the other plate.

3. A module as claimed in claim 1, in which said peripheral wall has a radially-inner surface of cylindrical cross-section and the shuttle has a radially-outer surface of the cylindrical profile.

4. A module as claimed in claim 1, in which all said blocks in said module other than said standard blocks are special blocks, and each said two-piece special block contains at least one passage and has an exterior face with coupling ports disposed at the end of its passages, said exterior face sealingly engaging a corresponding face of an adjacent block for aligning coupling ports and for interconnecting passages of the pneumatic-digital-computer circuit within said module.

5. A module as claimed in claim 1, in which said central passage is adapted to receive a flow-stop plug for closing said passage for use in various logic operations including "or," "not," "nor" logic operations.

6. A module as claimed in claim 1, in which the module blocks are arranged in axially-parallel rows, and are disposed in courses one above the other with each said block in each said row having axially-spaced end faces with sealed radial joints therebetween.

7. A module as claimed in claim 1, in which each said standard-block coupling port has a hollow sleeve for interconnection to matching coupling ports and adjacent blocks and for sealing engagement therebetween.

8. A module as claimed in claim 1, in which each said passage is adapted to receive an orifice plug for restricting flow therethrough.

9. A module as claimed in claim 1, in which said third and fourth passages have respective vent coupling ports disposed in the radially-outer face of said peripheral wall, and said outer face has groove means for forming vent passages between blocks when said blocks are stacked side-by-side and end-to-end.

References Cited by the Examiner

UNITED STATES PATENTS

| | | | |
|---|---|---|---|
| 1,787,628 | 1/1931 | Jones | 251—367 |
| 2,295,111 | 9/1942 | Hemmings | 251—367 X |
| 2,834,368 | 5/1958 | Gray | 251—367 X |
| 3,057,551 | 10/1962 | Etter | 251—367 X |
| 3,151,623 | 10/1964 | Riordan | 137—118 X |
| 3,202,170 | 8/1965 | Holbrook | 251—367 X |

STANLEY N. GILREATH, *Primary Examiner.*